United States Patent Office 3,389,541
Patented June 25, 1968

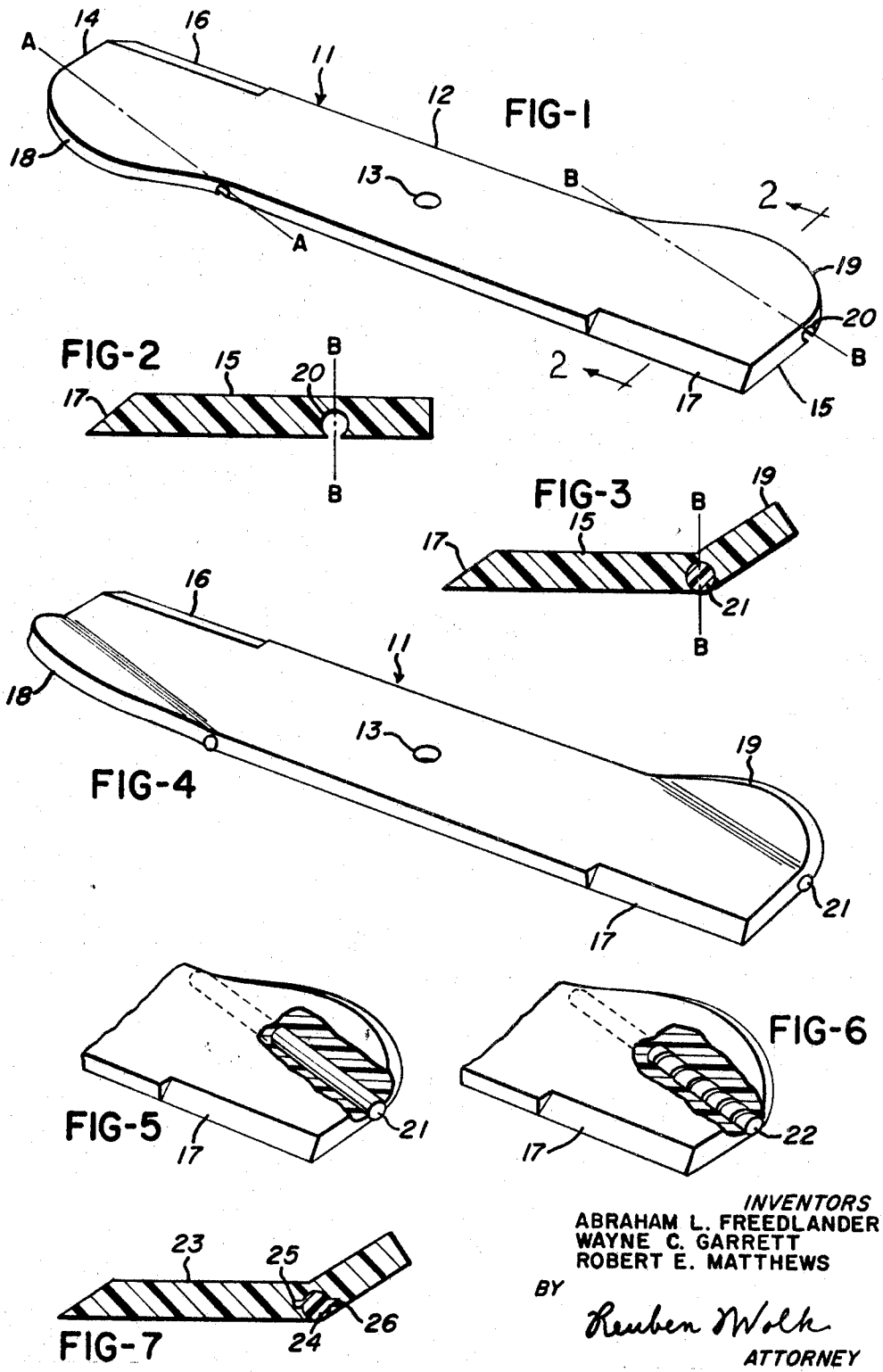

3,389,541
FLEXIBLE LAWNMOWER BLADE
Abraham L. Freedlander, Dayton, Ohio, and Wayne C. Garrett and Robert E. Matthews, Waynesville, N.C., assignors to Dayco Corporation, Dayton, Ohio, a corporation of Delaware
Filed July 21, 1967, Ser. No. 655,194
4 Claims. (Cl. 56—295)

ABSTRACT OF THE DISCLOSURE

A flexible elastomeric lawnmower blade having arms with cutting edges and portions opposite the cutting edges extending angularly upward to form a scoop shape. The upwardly extending portions are retained in place by means of a pin which is mounted in the blade at an angle with the longitudinal axis of the blade.

---

Conventional lawnmowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and rid over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cuttng and sufficient flexibility for safety. The blade is also extremely simple to manufacture and very low in cost.

In our earlier application Ser. No. 579,304, filed Sept. 14, 1966 and now Patent No. 3,343,350, we have described an invention relating to a blade formed of a non-reinforced homogeneous flexible elastomeric material. The present invention relates to a somewhat different form of this blade which has additional properties of flexibility and is formed differently. In addition, the blade of the present invention is designed to create a blast of air in an upward direction so that the grass immediately ahead of the cutting edge is pulled straight up, and thus renders the blades of grass easier to cut. The same feature of this design also creates considerable air turbulence which, therefore, tends to throw the grass outward through the exit chute or into a container which may be mounted on the mower and attached to the exit chute so that these blades will be caught, if so preferred by the operator. This is accomplished by forming the upper surface of the cutting portion of the blade in a special manner which is described below, in order to create the desirable results.

The concept of utilizing an upwardly angled or "scoop" shape has also been described in our earlier applications Ser. No. 589,106, now Patent No. 3,343,353 and Ser. No. 589,109, now Patent No. 3,343,354, both filed Oct. 24, 1966, but the blades described therein required molding into the finished form. In accordance with the present invention, however, a blade having a somewhat similar configuration may be formed of a flat sheet of material, a desired portion of this sheet bent into a scoop shape, and this bent portion held in position permanently. This permits the blade to be made much more cheaply than if molding were required, and also creates versatility in the final shape of the blade.

The invention will be more fully understood by referring to the following description and drawing, in which:

FIGURE 1 is a perspective view of the flat blank for the blade.

FIGURE 2 is a sectional view of the blade blank taken along line 2—2 of FIGURE 1.

FIGURE 3 is a view similar to FIGURE 2 showing a sectional view of a portion of the final blade.

FIGURE 4 is a perspective view of the finished blade.

FIGURE 5 is a fragmentary perspective view in partial section illustrating the securing means.

FIGURE 6 is a view similar to FIGURE 5 illustrating a modified form of securing means.

FIGURE 7 is a view similar to FIGURE 3 illustrating a further form of securing means.

Referring to the drawings, FIGURE 1 illustrates a blade blank 11 which may be cut or stamped from a flat sheet of material of which the final blade is to be made. This material is an elastomer, preferably a urethane elastomer of the type which is more fully described in the above-referenced patent applications. As indicated above, the desirable material provides a cutting member and yet has the necessary flexibility to minimize injuries. The blank has a central portion 12 and a mounting aperture 13 in the center whereby the finished blade may be mounted on the shaft of the mower. Extending outwardly from the central portion 12 are two arms 14 and 15 having tapered cutting edges 16 and 17 at one side thereof. Opposite each of the cutting edges are additional portions 18 and 19 which extend beyond the width of the main portion 12 of the blade. These portions 18 and 19 are shown as being generally curved but the specific shape of these portions will be in accordance with the desired final product and is not critical. Bend lines designated as A—A and B—B extend at an angle with the longitudinal axis of the blade and provide a pivot about which the portions 18 and 19 may be bent as described below. As best shown in FIGURE 2, apertures 20 are drilled or otherwise formed within the body of the blade along the bend lines A—A and B—B. The apertures are generally circular in cross section, and the lower portions thereof are tangent to the lower surface of the blade so that the apertures are open at the bottom of the blade.

In order to create the scoop shape which is desired to improve the air flow for the reasons set forth above, the portions 18 and 19 are bent upwardly about A—A and B—B and a generally circular pin 21 is then inserted within the apertures. The pin is slightly larger in diameter than the apertures, and thus the wedging action of the pin within the apertures serves to maintain the portions 18 and 19 in their upwardly bent shapes. The pins 21 may be made of similar material to the blade; they may be formed of a conventional plastic material such as styrene, polyvinyl chloride, or the like, or they may be made of such common materials as wood or metal. It is only necessary that the pins have sufficient rigidity to maintain the upwardly bent portions in the desired shape. The final configuration of the blade 11 is illustrated in FIGURES 3 and 4, and the relationship of the pin within the body is illustrated in FIGURE 5.

It is possible to achieve an additional holding effect by applying an adhesive to the pin before inserting it within the aperture. It is also possible to enhance the holding effect by modifying the pin as illustrated in FIGURE 6 in which the pin 22 has a helical ridge on its outer surface. Preferably, the helix will be in a reverse direction to tend to lock the pin more securely within the aperture.

FIGURE 7 illustrates a further modified form of the blade designated by reference numeral 23 in which a pin 24, generally cylindrical in shape, has longitudinal ridges 25 and 26 extending throughout its length. This also provides additional locking strength when the pin is inserted. Many other additional forms of the pin may be used, for example, a series of shorter pins may be inserted in each aperture, the pin and aperture may have a different cross section such as square, triangular, etc., or different types of ridges or locking features may be utilized.

It should also be noted that the upward bend of the portions 18 and 19 may be made under heat in order to relieve the strain within the material, depending on the specific composition of the blade and pin. Also as suggested above, the specific shape of the portions 18 and 19 may be varied to provide greater or smaller scoop areas, and the angle at which these portions may be bent may likewise be varied by changing the relative sizes of the aperture and pin.

Other variations are also contemplated as being within the scope of the invention.

We claim:

1. In a lawnmower having a rotatable shaft and a cutting blade mounted thereon, said blade principally composed of a flexible urethane elastomer and having a plurality of outwardly extending arms, the extremities of said arms having cutting edges and additional portions opposite thereto extending beyond the width of the main body of said blade, there being bend lines located at the junction of said portions and the main body of said blade and extending at an angle with the longitudinal axis of said blade, said portions bent upwardly about said bend lines to create a scoop shape, and means inserted into said blade along said bend lines to maintain said portions in their upwardly bent positions.

2. The blade of claim 1 in which said means is a cylindrical pin.

3. The blade of claim 2 in which said pin has a helical ridge on its outer surface.

4. The blade of claim 2 in which said pin has longitudinal ridges located on its outer surface.

References Cited
UNITED STATES PATENTS

| 2,648,370 | 8/1953 | Beach | 264—339 X |
| 2,957,295 | 10/1960 | Brown | 56—295 X |
| 3,320,732 | 5/1967 | Kirk | 56—295 |
| 3,343,350 | 9/1967 | Freedlander et al. | 56—295 |
| 3,343,354 | 9/1967 | Freedlander et al. | 56—295 |

ABRAHAM G. STORE, *Primary Examiner.*

ANTONIO F. GUIDA, *Examiner.*

P. A. RAZZANO, *Assistant Examiner.*